United States Patent Office 3,418,318
Patented Dec. 24, 1968

3,418,318
FUNGICIDALLY AND INSECTICIDALLY ACTIVE 2-TRIFLUOROMETHYL AND 2-PENTAFLUORO-ETHYL BENZIMIDAZOLES
Alan James Lambie, Kidderminster, Geoffrey Tattersall Newbold, Saffron Walden, and Michael Barry Purdew, Cambridge, England, assignors to Fisons Pest Control Limited, Harston, England
No Drawing. Filed Oct. 15, 1965, Ser. No. 496,713
Claims priority, application Great Britain, Oct. 22, 1964, 43,046/64
3 Claims. (Cl. 260—247.5)

ABSTRACT OF THE DISCLOSURE

Certain novel 2-trifluoromethyl and 2-pentafluoroethyl benzimidazoles and salts thereof have physiological activity, particularly as fungicides and insecticides.

---

The present invention relates to certain substituted benzimidazoles which have been found to possess physiological activity, to their preparation and to agricultural chemical and related compositions containing the same.

It has been found that the substituted benzimidazoles as hereinafter described are active as pesticides in many fields and that certain members are highly active as insecticides, particularly against caterpillars.

Accordingly the present invention is for a physiologically active composition which contains as an active ingredient a substituted benzimidazole of the following formula:

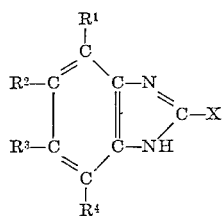

or salts thereof where in the above formula $R^1$, $R^2$, $R^3$ and $R^4$ may be the same or different and are selected from the group comprising hydrogen, alkyl (for example of 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromoethyl, trichloromethyl, hydroxymethyl, 2-chloroethyl, 2-hydroxyethyl or 2-methoxyethyl), carboxy, carboxy ester, carboxy amide, N-substituted carboxy amide, N-disubstituted carboxy amide, amino or mono or di-substituted amino (for example methylamino, dimethylamino, acetylamino, trifluoroacetylamino, benzensulphonamido, paratoluenesulphonamide, methanesulphonamido), thiol, alkylthiol and oxygenated derivatives thereof (for example —$SOR^6$ or —$SO_2R^6$ where $R^6$ is alkyl), sulphonic acid and esters and amides thereof and substituted amides (for example phenylsulphamyl, ethylsulphamyl, chloroethylsulphamyl) and a heterocyclic ring attached to the benzimidazole system through a nitrogen atom, radicals, where X is trifluoromethyl or pentafluoroethyl, provided that at least one of the groups $R^1$–$R^4$ is a heterocyclic ring.

Examples of the heterocyclic ring include morpholine, piperidine, piperazine, N'-alkylpiperazine and N'-arylpiperazine.

The present invention is also for a physiologically active composition which contains a substituted benzimidazole as identified above and at least one material selected from the group comprising wetting agents, inert diluents and solvents.

The present invention is also for the treatment of plants, materials, the soil, land or aquatic areas, which comprises applying thereon or thereto a physiologically active composition as defined above. The materials treated according to the invention may be any material susceptible to attack by detrimental organisms such as textiles or organic structural materials, for example fabric, paper and wood, and the treatment may be for example for the purposes of insect destruction or insect repelling. Thus, for example the compounds may be used for industrial protective purposes for example the moth proofing of textiles and the treatment of wood to inhibit insect attack. Such treatments may be applied to wood, paper, wool, cotton, linen, jute and the like. In such treatments the compounds are suitably used as a solution, for example in organic solvents, or as a suspension. For the treatment of wood, the compounds may be incorporated into paint or varnish compositions.

The present invention also comprises the new substituted benzimidazoles of the formula:

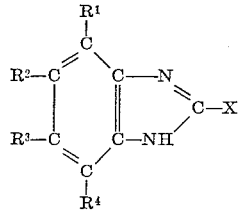

and salts thereof where in the above formula, the groups $R^1$, $R^2$, $R^3$, $R^4$ and X have the significance indicated above.

It has been found that the substituted benzimidazoles according to the invention generally possess physiological activity, viz. as insecticides, herbicides, fungicides etc. Certain of the compounds are especially active as insecticides, especially against caterpillars.

According to a preferred embodiment, the present invention is for compounds of the formula:

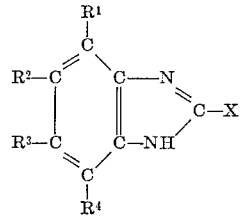

wherein $R^1$, $R^2$, $R^3$ and $R^4$ have the significance indicated above but where at least one of the groups $R^1$, $R^2$, $R^3$ and $R^4$ is chlorine, bromine, iodine, fluorine, nitro, amino alkyl, trifluoromethyl or a heterocyclic ring, and at least another one of the groups $R^1$–$R^4$ is a heterocyclic ring, for example morpholine.

The substituted benzimidazoles form salts, by replacement of the hydrogen on the nitrogen atom. The salts may comprise, for example, ammonium salts, metal salts such as for example sodium, potassium, calcium, zinc, copper and magnesium salts, amine salts such as for example methylamine, ethylamine, dimethylamine, triethylamine, ethanolamine, triethanolamine and benzylamine salts. According to a preferred embodiment the salts are alkali metal salts. Generally the alkali metal salts are crystalline solids, readily soluble in water.

The salts may be prepared by reacting the benzimidazole in aqueous or aqueous-organic solvent solution or suspension with an alkaline compound of the metal, such as the hydroxide, or with the amine, as appropriate. The metal salts may also be prepared by metathesis for example between the alkali metal salt of the benzimidazole and a salt of the metal.

Some of the benzimidazoles are also basic and can form salts with strong acids such as hydrochloric acid. Further certain of the lower substituted benzimidazoles can form quaternary ammonium salts.

The substituted benzimidazoles may be prepared by reacting the diamine of the formula:

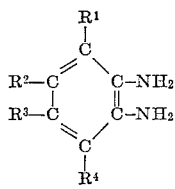

where $R^1$, $R^2$, $R^3$ and $R^4$ have the significance indicated above, with trifluoroacetic acid, trifluoroacetyl chloride, trifluoroacetic anhydride, trifluoroacetamide, pentafluoropropionic acid, pentafluoropropionyl chloride, pentafluoropropionic anhydride or pentafluoropropionamide.

The substituted benzimidazole may be incorporated into physiologically active compositions in any of the usual ways, with or without wetting agents and inert diluents.

Many of the salts of the substituted benzimidazoles embraced by the invention are water-soluble, and these may be used in physiologically active compositions as aqueous solutions, with or without wetting or dispersing agents, organic solvents, stickers and the like, which are commonly incorporated in sprays for agricultural and related purposes. However it is generally preferred to use the salts of the substituted benzimidazole in association with a wetting agent.

If desired the substituted benzimidazoles or salts thereof may be dissolved or dispersed in a water-immiscible solvent, such as for example a high boiling hydrocarbon, suitably containing dissolved emulsifying agents so as to act as a self-emulsifiable oil on addition to water.

The substituted benzimidazoles or salts thereof may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, fatty aromatic sulphonates such as alkylbenzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethyl-ammonium bromide and the like.

The physiologically active compositions according to the present invention may contain in addition to the substituted benzimidazole or salts thereof, other physiologically active materials such as herbicides, insecticides, fungicides and molluscicides. Insecticidal compositions may contain edible substances attractive to insects such as sugar, molasses and protein hydrolysates, suitably also with specific insect attractants.

The following examples are given to illustrate the present invention; the parts and percentages are by weight unless otherwise indicated.

EXAMPLE 1

14.9 parts of 4-(trichloro-ortho-diaminophenyl) morpholine (prepared by the reaction of 1,2,3,4-tetrachloro-5,6-dinitrobenzene with morpholine, followed by reduction) and 35 parts of trifluoroacetic acid were refluxed together for 3½ hours. After cooling, a large volume of water was added and the brown solid which precipitated was filtered off and dried to yield 18 parts (96.3%) of crude trichloro - morpholino - 2 - trifluoromethylbenzimidazole, melting point 190–200° C. Recrystallisation from benzene gave the pure compound, melting point 221–223° C.

Analysis.—$C_{12}H_9Cl_3F_3N_3O$ requires: C, 38.47%; H, 2.42%; Cl, 28.39%. Found: C, 38.58%; H, 2.55%; Cl, 28.25%.

EXAMPLE 2

In a similar way to the preceding example, 1-(trichloro-ortho-diaminophenyl)-piperidine was reacted with trifluoroacetic acid to form trichloro-piperdino-2-trifluoromethyl benzimidazole, melting point 185–187° C.

EXAMPLE 3

Young growing cabbage plants at the 3–4 true leaf stage were sprayed to run off with a solution containing 0.1% of the sodium salt of trichloro-morpholino-2-trifluoromethyl benzimidazole and 0.05% of the wetting agent available commercially as Lissapol NX. At daily intervals, representative plants were infested with second instar larvae of Pieris brassicae. 10 days after spraying all larvae was killed within 48 hours of introduction to the plants.

EXAMPLE 4

7 centimetre diameter discs of cabbage leaves were painted with 1 millilitre aqueous acetone solutions of each of the compounds identified below at concentrations equivalent to leaf applications of 80, 16, 8 and 4 ounces of active ingredient per acre. After drying, each leaf disc was placed in a 9 centimetre diameter petri dish, infected with ten second instar larvae of the cabbage white butterfly Pieris brassicae and covered with a glass lid. Three replications were made of each concentration level. After 48 hours the larvae were examined and the number dead were noted. Percentage mortalities are tabulated below.

| Compound | Rate of application, ounces per acre | | | |
| --- | --- | --- | --- | --- |
| | 80 | 16 | 8 | 4 |
| Trichloromorpholino-2-trifluoromethyl benzimidazole | 100 | 100 | 100 | 100 |
| Trichloropiperidino-2-trifluoromethyl benzimidazole | 100 | 100 | 100 | 100 |

We claim:
1. Trichloro - morpholino-2-trifluoromethyl benzimidazole.

2. Trichloro - piperidino-2-trifluoromethyl benzimidazole.

3. A member selected from the group consisting of compounds of the formula

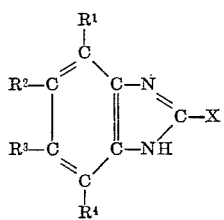

and salts thereof, wherein X is trifluoromethyl or pentafluoroethyl, three of the four R's are halogen and the fourth R is piperidino or morpholino.

References Cited

UNITED STATES PATENTS 1,915,334 6/1933 Salzberg et al. _____ 260—243
2,075,359 3/1937 Salzberg et al. _____ 167—22
3,192,227 6/1965 Brown et al. _____ 260—309.2

NICHOLAS S. RIZZO, Primary Examiner.

JOSE TOVAR, Assistant Examiner.

U.S. Cl. X.R.

167—33; 260—293, 309.2